Dec. 6, 1960 M. F. LAURENT 2,962,942
APPARATUS FOR REPRODUCING PATTERNS WITH OUTLINES REVERSED
Filed Oct. 3, 1958 2 Sheets-Sheet 1
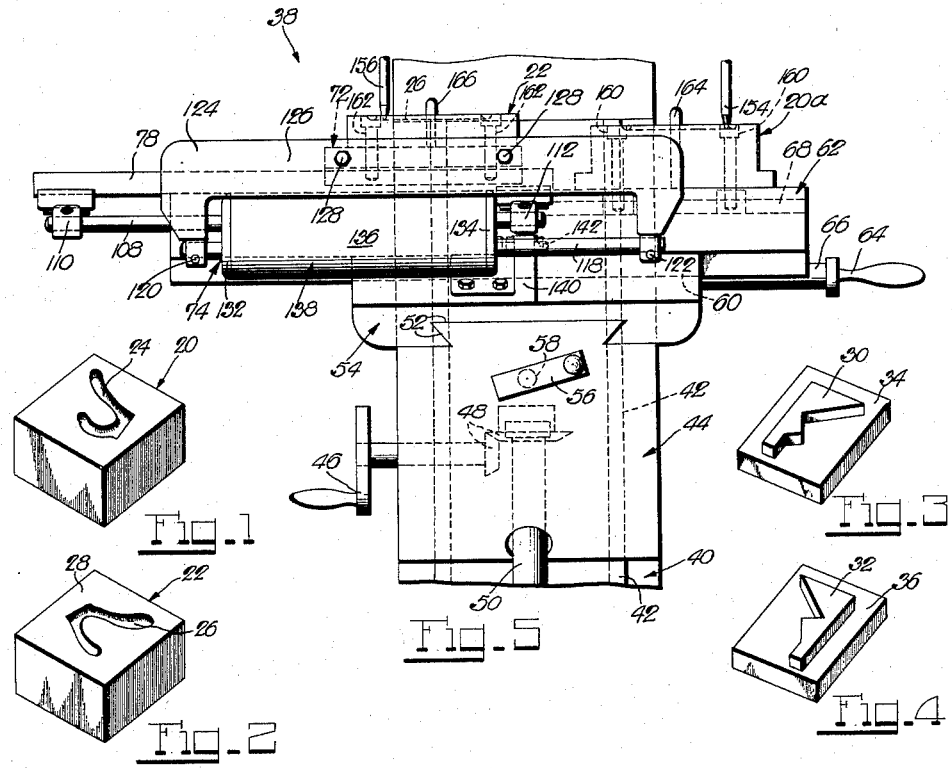
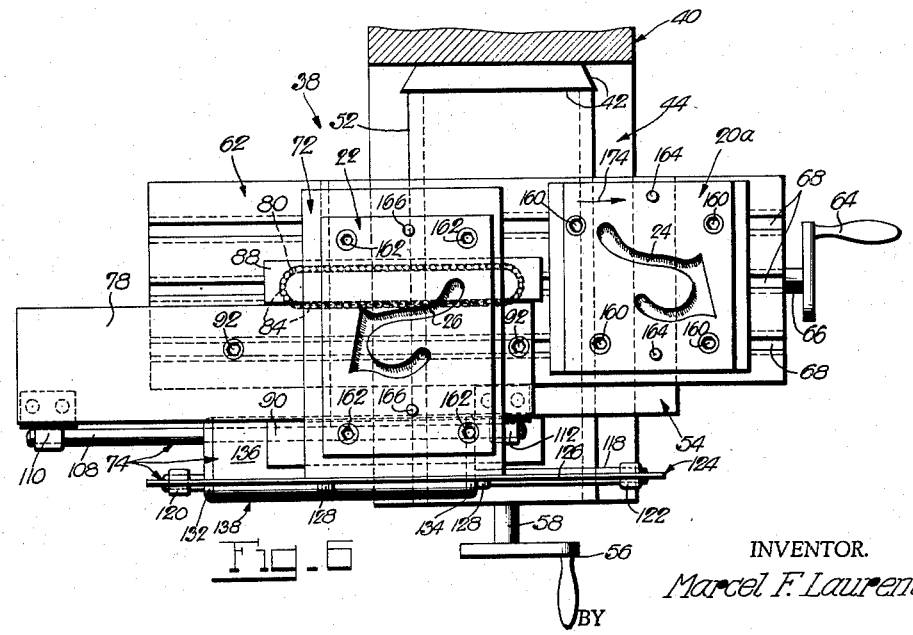
INVENTOR.
Marcel F. Laurent
BY
Attorney.

Dec. 6, 1960 M. F. LAURENT 2,962,942
APPARATUS FOR REPRODUCING PATTERNS WITH OUTLINES REVERSED
Filed Oct. 3, 1958 2 Sheets-Sheet 2
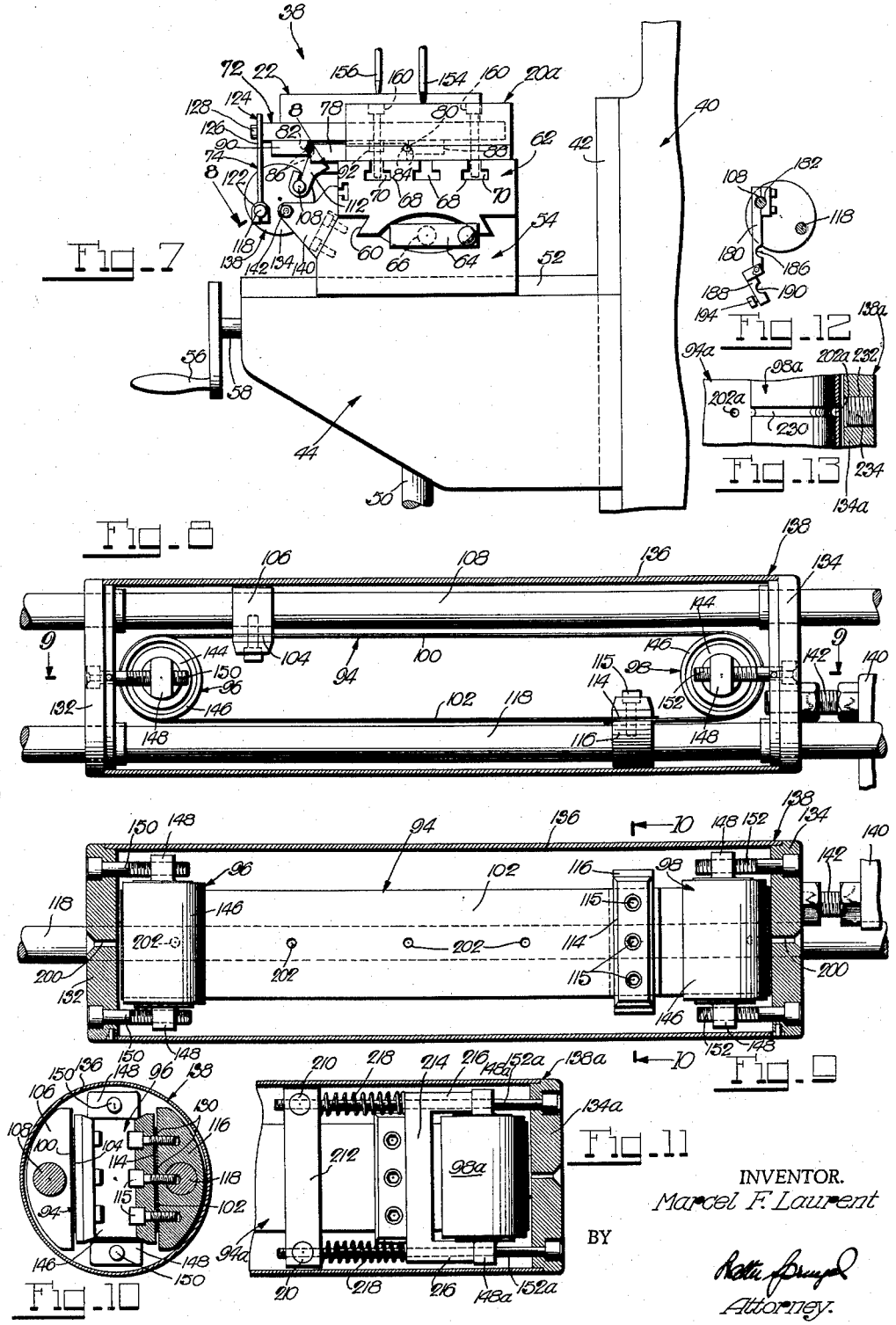
INVENTOR.
Marcel F. Laurent
BY
Attorney.

ical and cross feeds and also vertical feed to convert
the same into the aforementioned apparatus for reverse-
type reproduction of a pattern, without in any way pre-
venting the reuse of the machine for conventional milling
operations on removing this unit therefrom or even on
simply deactivating the latter.

Another object of the present invention is to provide
for the aforementioned apparatus or for the conversion
of a conventional milling machine the aforementioned
unit which is of simple and rugged construction and of
relatively small bulk and low cost, yet performs with high
accuracy, especially in the aforementioned accurate trans-
mission of the motion of the pattern in tracing its outline
to the blank of the reproduction-to-be and despite the
requirement that the motion of the blank in one of its
transverse paths is at any instant opposite in direction
to that of the motion of the pattern in the correspond-
ing one of its transverse paths.

Other objects and advantages will appear to those skilled
in the art from the following, considered in conjunction
with the accompanying drawings.

In the accompanying drawings, in which certain modes
of carrying out the present invention are shown for illus-
trative purposes:

Fig. 1 is a perspective view of an exemplary cavity-
type pattern to be reproduced in reverse in accordance
with the present invention;

Fig. 2 is a perspective view of the reverse reproduction
of the pattern of Fig. 1;

Fig. 3 is a perspective view of an exemplary relief-
type pattern which may also be reproduced in reverse in
accordance with the present invention;

Fig. 4 is a perspective view of the reverse reproduction
of the pattern of Fig. 3;

Figs. 5, 6 and 7 are fragmentary front, top and side
views, respectively, of apparatus embodying the present
invention, with Fig. 6 being partly in section;

Fig. 8 is an enlarged fragmentary section, partly in
elevation, through a certain prominent unit of the appa-
ratus, as taken on the line 8—8 of Fig. 7;

Fig. 9 is a section taken on the line 9—9 of Fig. 8;

Fig. 10 is a section taken on the line 10—10 of Fig. 9;

Fig. 11 is a fragmentary section through a unit which is
similar to, but modified from, the unit of Fig. 8;

Fig. 12 is a fragmentary section through apparatus em-
bodying the present invention in a further modified man-
ner; and Fig. 13 is a fragmentary section through part of appa-
ratus embodying the present invention in another modified
manner.

Referring to the drawings, and more paritcularly to
Figs. 1 and 2 thereof, the reference numerals 20 and 22
designate the companion members of an exemplary par-
tible mold for casting an object, presently a clotheshanger.
To this end, the mold members 20 and 22 have comple-
mentary cavities 24 and 26, respectively, of the outline
of a clotheshanger. The clotheshanger was arbitrarily
chosen for illustration, its outline being representative of
non-symmetric outlines of many other mold or die cav-
ities with which the present invention is concerned. Thus,
in order that the exemplary mold cavities 24 and 26 may
be truly complemental, or congruent, or closing the mold
members 20, 22 for a casting operation, it follows, and it
appears from Figs. 1 and 2, that the outline of one mold
cavity must be in reverse of the outline of the other mold
cavity. Hence, assuming that the mold member 22 has
been provided with the cavity 26 in convenitonal manner
by first laying out the profile of the cavity on the mold
surface 28 and then gradually machining the cavity
into this mold surface within its laid-out outline, the
task of providing the other mold member 20 in con-
ventional manner with its cavity 24 is clearly more difficult

United States Patent Office 2,962,942
Patented Dec. 6, 1960

2,962,942

APPARATUS FOR REPRODUCING PATTERNS
WITH OUTLINES REVERSED

Marcel F. Laurent, Milford, Conn., assignor to The
Laurent Corporation, Milford, Conn., a corporation
of Connecticut Filed Oct. 3, 1958, Ser. No. 765,184

4 Claims. (Cl. 90—58)

This invention relates to apparatus for reproducing
patterns in reverse.

The present invention is concerned with the reproduc-
tion in exact reverse of a pattern of any shape but without
symmetry, with the reproduction being congruent with
the pattern on inverting either 180 degrees relative to the
other. Thus, it is contemplated to produce molds or cast-
ing dies with cavities of outlines in exact reverse of the
nonsymmetric outlines of the cavities of their companion
molds or dies, or to produce reverse companion figures
of nonsymmetric outline in relief on integral bases there-
of, for example. Hence, the present invention is con-
cerned, in the first place, with the reproduction in exact
reverse of a nonsymmetric outline of a two-dimensional
figure, and is concerned, in the second place, with the
production of a three-dimensional cavity or object in
relief having this outline or figure. Thus, if a cavity is
to be produced the figure or outline thereof is addition-
ally machined within its confines to the desired cavity
depth, and if an object in relief is to be reproduced the
figure or outline thereof is additionally machined outside
its confines to bring it into relief.

It is the primary aim and object of the present inven-
tion to provide apparatus for the reproduction in exact
reverse of a pattern of any non-symmetric outline, by the
mere process of tracing the pattern.

It is another object of the present invention to provide
apparatus for the aforementioned reverse-type reproduc-
tion of a pattern, which machines a blank into the exact
reverse of the pattern as the latter is being subjected to
a tracer in the first place, and at a rate as gradually as
the machining of the blank permits the tracer to contact
every surface portion of the pattern in the second place.

A further object of the present invention is to provide
apparatus for the aforementioned reverse-type reproduc-
tion of a pattern, in which the outline of the pattern is
reproduced on the blank of the reproduction-to-be by
simultaneously moving, preferably the pattern and blank
relative to the tracer and reproducing tool, in two identi-
cal transverse paths, respectively, through equal distances
for their resultant motion in tracing the outline of the
pattern, wtih the motion of the blank in one of its trans-
verse paths being, however, at any instant in a direction
opposite to that of the motion of the pattern in the cor-
responding one of its transverse paths to thereby achieve
reversal of the outline of the pattern on the blank.

It is another object of the present invention to provide
apparatus for reverse-type reproduction of a pattern,
which not only transmits the motion of the pattern in
tracing its outline to the blank of the reproduction-to-
be in the aforementioned manner, but which also provides
for additional joint motion, preferably of the pattern and
blank relative to the tracer and reproducing tool, for re-
producing a three-dimensional cavity or object in relief
of the desired outline in reverse of that of the pattern.

It is a further object of the present invention to provide
a largely self-contained unit which may readily be releas-
ably attached to a conventional milling machine with longithan the formation of the first cavity 26, for the second cavity 24 must not only be truly complementary with, but in its outline also the reverse of that of the first cavity 26. The hereinafter described apparatus of the present invention will immeasurably facilitate the above-mentioned task of producing the second of the complementary mold cavities with its non-symmetric outline reversed from that of the first-produced mold cavity.

The apparatus to be described is not limited to the reproduction with reverse outline of a cavity, but is fully capable of reproduction with reverse outline of relief-type objects, such as the arbitrarily chosen symbols 30 and 32 (Figs. 3 and 4) on back plates or mats 34 and 36, respectively. Thus, since these exemplary symbols in relief are integral with their respective back plates and their outlines are non-symmetric, nothing short of reproduction, for example, of the symbol 30 and its back plate 34, with the outline of the symbol reversed, however, will result in the other symbol 32 and its back plate 36.

The apparatus embodying the present invention is designated by the reference numeral 38 (Figs. 5, 6 and 7). The present apparatus is in quite a few respects similar to a conventional milling machine with longitudinal and cross feed provisions and also vertical feed provisions. Thus, the apparatus 38 comprises a frame 40 providing a presently vertical guideway 42 for a support or knee 44 with its usual vertical feed provisions (Fig. 5), including a handle 46, bevel gears 48, elevating screw 50 and a screw housing therefor (not shown). Slidable in a guideway 52 on the knee 44 is a saddle or table 54 with its usual cross-feed provisions, including a handle 56 and operating spindle 58. The saddle 54 is provided with a guideway 60 for a table 62 with its usual longitudinal feed provisions, including a handle 64 and operating spindle 66. The table 62 may in its top be provided with the usual longitudinal T-slots 68 for sliding reception of blocks 70 (Fig. 7) to which work to-be-machined may releasably be bolted. The apparatus described so far is entirely conventional and forms no part of the present invention, except insofar as parts thereof enter into combination with the latter. In accordance with the present invention, there is provided a secondary table 72 which is slidable in a path parallel to that of the other or primary table 62, and feed provisions 74 operative on movement of the primary table 62 in either direction in its guideway 60 to move the secondary table 72 in its path an equal amount as, but at any instant in a direction opposite to that of, the primary table 62. To this end, the secondary table 72 is advantageously guided directly on the primary table 62 for movement parallel to the longitudinal feed direction of the latter in its guideway 60. To achieve optimum play-free and smooth guidance of the secondary table 72 on the primary table 62, the former is presently guided on the latter through intermediation of a track 78 and ball bearings 80 and 82 (Figs. 6 and 7) with their races 84 and 86 provided on the track 78 and in runways 88 and 90, respectively, of which the track 78 is releasably bolted at 92 to the primary table 62 and the runways 88 and 90 are carried by the secondary table 72 on the underside thereof (Fig. 7).

The feed provisions 74 are in the form of a reverse drive connection between the primary and secondary tables 62 and 72. This reverse drive connection between the tables is, in accordance with another aspect of the present invention, of preferred and improved belt-type. To this end, a belt 94 is guided over fixed pulleys 96 and 98 (Figs. 8 and 9) with its operating runs 100 and 102 between these pulleys extending parallel to each other and longitudinally of the primary table 62. The belt run 100 is drivingly connected with the primary table 62, and the other belt run 102 is drivingly connected with the secondary table 72. To this end, the belt run 100 is clamped at 104 to a fixed follower 106 on an action rod 108 (Figs. 5 to 10) which at its ends is clamped to depending brackets 110 and 112 on the track 78 on the primary table 62, while the other belt run 102 is clamped at 114 to a fixed follower 116 on action rod 118 (see also Fig. 10) which at its ends is clamped at 120 and 122 to the legs of a U-shaped bar 124 which with its yoke 126 is secured to the secondary table 72, presently by bolts 128. Of course, the action bars 108 and 118 are thus carried by their respective tables 62 and 72 that they extend parallel to the belt runs 100 and 102 (Fig. 8), and to the feed direction of table 62.

The belt 94 is presently of steel and formed by a steel band the overlapped ends of which are presently locked to the follower 116 on the action rod 118 by the clamping screws 115 in the former which pass through holes 130 in these overlapped band ends (see also Fig. 10). The pulleys 96 and 98 are carried by mounting members or discs 132 and 134, respectively, which are slidably received on the action rods 108 and 118, and which are held in suitably spaced relation by an interposed spacer sleeve 136 which together with the mounting members 132 and 134 forms a cylinder 138. The parts 132, 134 and 136 of the cylinder 138 are held in their assembled relation by the steel belt 94 which is held taut. The cylinder 138 is held fixed relative to the tables 62 and 72, and the same is to this end connected with the saddle 54 through intermediation of a bracket 140 on the latter and an adjusting screw 142 which presently is received by the mounting member 134 of the cylinder (Figs. 5 and 7 to 9). Hence, while the cylinder 138 is fixed, presently adjustably, relative to the tables 62 and 72, it moves in unison with these tables on the cross feed of the saddle 54 on the knee 44, as will be readily understood.

The pulleys 96 and 98 are preferably and advantageously antifriction bearings, each having inner and outer races 144 and 146, with the steel belt 94 guided over the outer races thereof. The inner races 144 of these bearings are presently provided with end lugs 148 in which are threadedly received set screws 150 and 152 carried by the respective end members 132 and 134 of the cylinder 138. On tightening the set screws 150 and 152, the steel belt 94 may be put under any desired tension best suited for the transmission of the motion of the primary table 62 to the secondary table 72 without any play in or lost motion between the transmission parts.

It follows from the preceding that motion of the primary table 62 to the right in Fig. 6, for example, by means of its longitudinal feed provisions will result in simultaneous motion in an equal amount of the secondary table 72 in the opposite direction, however, i.e., to the left in Fig. 6. Thus, such motion of the primary table 62 and of its action rod 108 (to the right in Fig. 8 in the present example) will cause the associated belt run 100 to follow this action rod to the right, with the result that the other belt run 102, and with it the associated action rod 118 and secondary table 72, will be moved the same amount as, but in a direction opposite to that of, the primary table 62, i.e., to the left in Figs. 6 and 8 in the present example.

The instant apparatus 38 is further provided with a head (not shown), which may be a conventional milling head, carrying a reproducing tool, presently a milling cutter 154 which is power-driven and in its cutting stroke controlled by a conventionally operated tracer 156.

Let it now be assumed that it is desired to produce the exemplary mold member 20 (Fig. 1) which is a companion to the mold member 22 (Fig. 2), in which case the mold member 22 becomes the pattern the cavity 26 of which is to be reproduced, in reverse outline, however, in or on a blank. To use the present apparatus for this purpose, the blank 20a is releasably bolted at 160 to the primary table 62, while the pattern 22 is releasably bolted at 162 to the secondary table 72 (Figs. 5 to 7), the blank and pattern being for later accurate alignment of their complementary cavities preferably accurately located on their respective tables 62 and 72 by dowel pins 164 and 166 thereon. Of course, the blank and pattern are thus mounted on their respective tables, that they are in operative alignment with the reproducing tool 154 and tracer 156, respectively, throughout their motion in tracing the cavity 26 in the pattern. The power drive of the reproducing tool 154 is next started, whereupon the knee 44 may be raised until the blank 20a and pattern 22 are with their top surfaces in close proximity to the reproducing tool 154 and tracer 156, respectively. The tool 154 and tracer 156 may then be brought into cutting and tracing relation with the blank 20a and pattern 22, respectively, in the conventional manner of tools and tracers carried by hydraulically or otherwise actuated heads customarily used for this purpose. In then following one of the usual procedures, the tables 62 and 72 will be fed longitudinally back and forth, interrupted by their intermittent cross-feed at each reversal in steps commensurate with the permissible cut. This procedure is repeated as often as necessary to achieve the final depth of the reproduction.

Of course, since the blank 20a on the primary table 62 travels with the latter in the direction of the arrow 174, i.e., opposite to the direction of motion of the secondary table 72, it stands to reason that in reproducing the cavity 26 of the pattern 22 in the blank 20a in the aforementioned manner, the cavity 24 in the latter will have the reverse outline of the pattern cavity 26.

The foregoing description of the reproduction with reverse outline of a cavity-type pattern by the instant apparatus 38 indicates the obvious use of the same apparatus for making a reproduction with reverse outline of a relief-type pattern, such as that shown in Fig. 3, for instance, the only difference being that the blank is, for the relief formation, machined to depth outside the confines of the relief outline. Also, while the aforementioned exemplary cavity-type and relief-type patterns that may be reproduced with reverse outline by the present apparatus are three-dimensional, it is quite obvious that the present apparatus lends itself to the reproduction of two-dimensional patterns in reverse.

The present apparatus is universal in character in that it may be used for direct or reverse reproduction of patterns. Thus, while the use of the present apparatus for reproducing a pattern with reverse outline has been fully described hereinbefore, the same apparatus may readily be used for making a direct reproduction of a pattern by merely locking the action rods 108 and 118 together so that they move jointly, and releasing the cylinder 138 for movement with these rods by dismounting the bracket 140, thereby circumventing the motion-reversing belt drive 94, 96, 98. This may readily be achieved by simply connecting the action rods 108 and 118 by a link 180 (Fig. 12) which at 182 is clamped, ordinarily loosely, to the action rod 108, for instance, and which is provided with a bearing aperture 186 and a pivoted cap 188 having a bearing aperture 190 complementary with the bearing aperture 186. Thus, if it is desired to use the present apparatus for direct reproduction of patterns, or for that matter for a conventional milling operation other than pattern reproduction with which the reverse motion of the secondary table 72 would interfere, it is merely necessary to feed the primary table 62 for the purpose of zeroing both tables 62 and 72 in a particular relative disposition best suited for a particular operation, whereupon the link is turned to bring its bearing aperture 186 to seat against the rod 118 (Fig. 12), and the cap 188 is then closed thereover and firmly clamped thereto by a screw 194 which is threadedly received by the link 180, the latter being then also firmly clamped at 182 to the action rod 108 so that the link connection 180 across the action rods will be firm and permit no play between them. To reconvert the apparatus for reverse reproduction of patterns, it is merely necessary to release the link 180 from the action rod 118 and return it into the position shown in Fig. 12.

It follows from the preceding that the same apparatus may quickly be converted for direct or reverse reproduction of patterns, which greatly enhances its value. For example, the mold member 22 with its cavity 26 (Fig. 2) may be a single master pattern, and from it may be produced by the present apparatus as many direct reproductions thereof as well as reverse reproductions thereof (Fig. 1) as are desired for mass molding or casting purposes.

The feed provisions 74 for the secondary table 72 are constructed so as to permit no play between their motion-transmitting parts, which is a prime requisite for accurate reproduction in reverse of a pattern. The use of the steel belt 94, and of the antifriction bearings 96 and 98 as pulleys therefor, as well as the adjustability of the tension in the steel belt through adjustability of its pulleys, contribute greatly toward achieving this end. Another prime requisite for accurate reproduction in reverse of a pattern is that the force required for the feed of the primary and secondary tables 62 and 72 is not only constant but also relatively light, and that the motion of these tables is even and smooth and not in the least jarring. Contributory toward this achievement are the antifriction bearings 96 and 98 which serve as pulleys for the steel belt 94 and offer comparatively small frictional resistance despite quite considerable tension in the steel belt. Further contributory toward this achievement is the guidance of the secondary table 72 on the ball bearings 80 and 82 which offer little resistance to this table's motion, yet may have a snug fit with this table to prevent any play thereof even after a long time. Finally, provisions are made whereby the tension in the steel belt 94 may readily be adjusted to any desired magnitude without subsequently incurring the slightest lateral creep of this belt on either of its pulleys which might interfere with the smooth action, if not jam the action, of the feed provisions 74 for the secondary table 72, or even tear the steel belt. To this end, the cylinder 138, and more particularly either or both end members 132 and 134 thereof, are provided with holes 200 (Fig. 9) which may be sight holes through which to view longitudinally mark means on the steel belt 94 which presently are in the form of longitudinally spaced and aligned, relatively small holes 202 in the belt. Thus, on appropriately tightening the belt 94 through adjustment of the set screws 150 or 152, or both, the longitudinal feed of the primary table 62 is manipulated to cause simultaneous motion of the tables 62 and 72, while at the same time the holes 202 in the belt 94 are viewed through either sight hole 200 as they pass. If consecutive holes 202 in the belt do not pass the particular sight hole 200 in perfect, or at least in the same, alignment with the latter, appropriate ones of the set screws 150 or 152 are further adjusted until these holes in the belt pass the sight hole in the same alignment therewith, whereupon the belt will run true on its pulleys and not creep sideways on either and the force required for its drive is constant as desired.

The present feed provisions 74 are also in the form of a substantially self-contained unit or sub-units of relatively low cost and small bulk which may quite readily be attached to a conventional milling machine for converting the same into the present pattern reproduction apparatus. In this connection, the cylinder enclosure 138 of the belt drive 94 and the extension of the action rods 108 and 118 therethrough, in conjunction with the mounting adapter or bar 124 on the action rod 118, not only combines these parts into a self-contained unit, but adapts the latter for quick releasable attachment to the secondary table 72 which may form part of another or sub-unit. This other unit, which may also be self-contained, may consist of the secondary table 72 and its guide and track provisions 80, 82 and 78 with the clamping brackets 110 and 112 for the action rod 108. These two units may readily be assembled into a single unit by merely attaching the adapter bar 124 to the secondary table 72 and clamping the action bar 108 to the brackets 110 and 112, and the single unit thus assembled is as readily attached to a conventional milling machine without any change of or addition to the same, by merely bolting the track 78 to the conventional table of the milling machine, as at 92 in Fig. 6, for instance. The only change in the milling machine required for its conversion into a pattern reproducing apparatus is occasioned by the mounting of the cylinder-fixing bracket 140 on the saddle 54, and this change involves the mere drilling and tapping of two holes in the saddle.

Fig. 11 shows a modified cylinder unit 138a which differs from the described cylinder unit 138 (Figs. 8 and 9) in that either or both pulleys of the belt drive are connected with their adjustment screws through intermediation of compression springs. Thus, Fig. 11 shows the adjustment screws 152a in the end member 134a of the cylinder 138a threadedly received by trunnions 210 in a crossbar 212, while a U-shaped bracket 214 is slidably received by the adjustment screws 152a and bears with its legs 216 against the end lugs 148a of the antifriction-type pulley 98a. Springs 218 of suitable stiffness surround the adjustment screws 152a and are interposed between the crossbar 212 and bracket 214, so that on tightening the screws 152a the springs 218 will be loaded and their force will urge the pulley 98a into tensioning the steel belt 94a. With this arrangement, the tensioning of the steel belt 94a will respond in micrometer-like fashion to the adjustment of the screws 152a, thereby not only facilitating the task of accurately adjusting these screws for a desired tension in the steel belt and for non-creep of the latter on either of its pulleys, but also more securely and lastingly holding the steel belt under a given tension. Furthermore, if perchance a foreign particle should find its way into the cylinder unit 138a and get between the pulley 98a and steel belt 94a, the springs 218 will yield sufficiently to permit the passage of the particle from the pulley and belt without interfering with their performance or damage to either.

Reference is now had to Fig. 13 which shows an alternative and mostly preferred mode of adjusting the tension of the steel belt 94a without incurring any lateral creep of the same on its pulleys on operation of the apparatus. Thus, either one or both of the pulleys, presently at least the pulley 98a shown, is provided with a substantially central peripheral groove 230 which may be viewed through a relatively large sight hole 232 in the end member 134a of the cylinder 138a to observe the alignment of successive holes 202a in the belt 94a with the pulley groove 230 during a longitudinal trial feed of the primary table. If the preceding adjustment of the set screws of the pulley 98a, for a desired tension of the steel belt 98a was non-uniform, progressive holes 202a in the steel belt will be observed to creep out of alignment with the peripheral pulley groove 230, indicating correction of the adjustment of the set screws of the pulley 98a until progressive holes 202a in the steel belt remain in alignment with the pulley groove 230 as observed through the sight hole 232. The sight hole 232 in the end member 134a of the cylinder 138a is normally closed by a removable plug 234.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said pulleys are antifriction bearings having inner and outer races and opposite end lugs on the inner races projecting beyond the outer races, and each of said bearings is held to its respective member by adjustable set screws connecting the latter with the end lugs, respectively, on the inner race of said bearing to hold said steel belt under predetermined tension.

2. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said belt has narrow mark means longitudinally thereof, each of said pulleys has a shaft and is held to its respective member by two set screws which are spaced axially of said pulley and connect said member with said shaft to hold said steel belt under predetermined tension, and said cylinder has a sight hole in line with said mark means to aid in achieving even adjustment of either pulley by its respective set screws.

3. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said belt has longitudinally aligned and relatively small holes of identical diameters, said pulleys are antifriction bearings having inner and outer races of which the outer race of at least one bearing has a substantially central peripheral groove of a width substantially equal to the diameters of said holes, each of said bearings is with its inner race held to its respective member by two adjustable set screws spaced axially of said bearing to hold said steel belt under predetermined tensions, and said cylinder has an opening through which to view said holes in their relation to said peripheral bearing groove as an aid in achieving even adjustment of either bearing by its respective set screws.

4. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said one table is provided with an antifriction guide for the movement of said other table in its said path, said antifriction guide comprising parallel pairs of spaced outer and inner races formed by adjacent straight surfaces of said tables, respectively, and antifriction elements interposed between the races of each pair.

References Cited in the file of this patent

UNITED STATES PATENTS

| | | |
|---|---|---|
| 2,303,956 | Rossbacher | Dec. 1, 1942 |
| 2,477,985 | Keim | Aug. 2, 1949 |
| 2,831,405 | Sallwey et al. | Apr. 22, 1958 |
| 2,858,743 | Sallwey | Nov. 4, 1958 |

Certificate of Correction

Patent No. 2,962,942

December 6, 1960

Marcel F. Laurent

It is hereby certified that error appears in the above numbered patent requiring correction and that the said Letters Patent should read as corrected below.

In the grant (only), columns 5, 6, 7, and 8, were inadvertently omitted and should be inserted as part of said Letters Patent:

tive alignment with the reproducing tool 154 and tracer 156, respectively, throughout their motion in tracing the cavity 26 in the pattern. The power drive of the reproducing tool 154 is next started, whereupon the knee 44 may be raised until the blank 20a and pattern 22 are with their top surfaces in close proximity to the reproducing tool 154 and tracer 156, respectively. The tool 154 and tracer 156 may then be brought into cutting and tracing relation with the blank 20a and pattern 22, respectively, in the conventional manner of tools and tracers carried by hydraulically or otherwise actuated heads customarily used for this purpose. In the following one of the usual procedures, the tables 62 and 72 will be fed longitudinally back and forth, interrupted by their intermittent cross-feed at each reversal in steps commensurate with the permissible cut. This procedure is repeated as often as necessary to achieve the final depth of the reproduction.

Of course, since the blank 20a on the primary table 62 travels with the latter in the direction of the arrow 174, i.e., opposite to the direction of motion of the secondary table 72, it stands to reason that in reproducing the cavity 26 of the pattern 22 in the blank 20a in the aforementioned manner, the cavity 24 in the latter will have the reverse outline of the pattern cavity 26.

The foregoing description of the reproduction with reverse outline of a cavity-type pattern by the instant apparatus 38 indicates the obvious use of the same apparatus for making a reproduction with reverse outline of a relief-type pattern, such as that shown in Fig. 3, for instance, the only difference being that the blank is, for the relief formation, machined to depth outside the confines of the relief outline. Also, while the aforementioned exemplary cavity-type and relief-type patterns that may be reproduced with reverse outline by the present apparatus are three-dimensional, it is quite obvious that the present apparatus lends itself to the reproduction of two-dimensional patterns in reverse.

The present apparatus is universal in character in that it may be used for direct or reverse reproduction of patterns. Thus, while the use of the present apparatus for reproducing a pattern with reverse outline has been fully described hereinbefore, the same apparatus may readily be used for making a direct reproduction of a pattern by merely locking the action rods 108 and 118 together so that they move jointly, and releasing the cylinder 138 for movement with these rods by dismounting the bracket 140, thereby circumventing the motion-reversing belt drive 94, 96, 98. This may readily be achieved by simply connecting the action rods 108 and 118 by a link 180 (Fig. 12) which at 182 is clamped, ordinarily loosely, to the action rod 108, for instance, and which is provided with a bearing aperture 186 and a pivoted cap 188 having a bearing aperture 190 complementary with the bearing aperture 186. Thus, if it is desired to use the present apparatus for direct reproduction of patterns, or for that matter for a conventional milling operation other than pattern reproduction with which the reverse motion of the secondary table 72 would interfere, it is merely necessary to feed the primary table 62 for the purpose of zeroing both tables 62 and 72 in a particular relative disposition best suited for a particular operation, whereupon the link is turned to bring its bearing aperture 186 to seat against the rod 118 (Fig. 12), and the cap 188 is then closed thereover and firmly clamped thereto by a screw 194 which is threadedly received by the link 180, the latter being then also firmly clamped at 182 to the action rod 108 so that the link connection 180 across the action rods will be firm and permit no play between them. To reconvert the apparatus for reverse reproduction of patterns, it is merely necessary to release the link 180 from the action rod 118 and return it into the position shown in Fig. 12.

It follows from the preceding that the same apparatus may quickly be converted for direct or reverse reproduction of patterns, which greatly enchances its value. For example, the mold member 22 with its cavity 26 (Fig. 2) may be a single master pattern, and from it may be produced by the present apparatus as many direct reproductions as well as reverse reproductions thereof (Fig. 1) as are desired for mass molding or casting purposes.

The feed provisions 74 for the secondary table 72 are constructed so as to permit no play between their motion-transmitting parts, which is a prime requisite for accurate reproduction in reverse of a pattern. The use of the steel belt 94, and of the antifriction bearings 96 and 98 as pulleys therefor, as well as the adjustability of the tension in the steel belt through adjustability of its pulleys, contribute greatly toward achieving this end. Another prime requisite for accurate reproduction in reverse of a pattern is that the force required for the feed of the primary and secondary tables 62 and 72 is not only constant but also relatively light, and that the motion of these tables is even and smooth and not in the least jarring. Contributory toward this achievement are the antifriction bearings 96 and 98 which serve as pulleys for the steel belt 94 and offer comparatively small frictional resistance despite quite considerable tension in the steel belt. Further contributory toward this achievement is the guidance of the secondary table 72 on the ball bearings 80 and 82 which offer very little resistance to this table's motion, yet may have a snug fit with this table to prevent any play thereof even after a long time. Finally, provisions are made whereby the tension in the steel belt 94 may readily be adjusted to any desired magnitude without subsequently incurring the slightest lateral creep of this belt on either of its pulleys which might interfere with the smooth action, if not jam the action, of the feed provisions 74 for the secondary table 72, or even tear the steel belt. To this end, the cylinder 138, and more particularly either or both end members 132 and 134 thereof, are provided with holes 200 (Fig. 9) which may be sight holes through which to view longitudinally mark means on the steel belt 94 which presently are in the form of longitudinally spaced and aligned, relatively small holes 202 in the belt. Thus, on appropriately tightening the belt 94 through adjustment of the set screws 150 or 152, or both, the longitudinal feed of the primary table 62 is manipulated to cause simultaneous motion of the tables 62 and 72, while at the same time the holes 202 in the belt 94 are viewed through either sight hole 200 as they pass. If consecutive holes 202 in the belt do not pass the particular sight hole 200 in perfect, or at least in the same, alignment with the latter, appropriate ones of the set screws 150 or 152 are further adjusted until these holes in the belt pass the sight hole in the same alignment therewith, whereupon the belt will run true on its pulleys and not creep sideways on either and the force required for its drive is constant as desired.

The present feed provisions 74 are also in the form of a substantially self-contained unit or sub-units of relatively low cost and small bulk which may quite readily be attached to a conventional milling machine for converting the same into the present pattern reproduction apparatus. In this connection, the cylinder enclosure 138 of the belt drive 94 and the extension of the action rods 108 and 118 therethrough, in conjunction with the mounting adapter or bar 124 on the action rod 118, not only combines these parts into a self-contained unit, but adapts the latter for quick releasable attachment to the secondary table 72 which may form part of another or sub-unit. This other unit, which may also be self-contained, may consist of the secondary table 72 and its guide and track provisions 80, 82 and 78 with the clamping brackets 110 and 112 for the action rod 108. These two units may readily be assembled into a single unit by merely attaching the adapter bar 124 to the secondary table 72 and clamping the action bar 108 to the brackets 110 and 112, and the single unit thus assembled is as readily attached to a conventional milling machine without any change of or addition to the same, by merely bolting the track 78 to the conventional table of the milling machine, as at 92 in Fig. 6, for instance. The only change in the milling machine required for its conversion into a pattern reproducing apparatus is occasioned by the mounting of the cylinder-fixing bracket 140 on the saddle 54, and this change involves the mere drilling and tapping of two holes in the saddle.

Fig. 11 shows a modified cylinder unit 138a which differs from the described cylinder unit 138 (Figs. 8 and 9) in that either or both pulleys of the belt drive are connected with their adjustment screws through intermediation of compression springs. Thus, Fig. 11 shows the adjustment screws 152a in the end member 134a of the cylinder 138a threadedly received by trunnions 210 in a crossbar 212, while a U-shaped bracket 214 is slidably received by the adjustment screws 152a and bears with its legs 216 against the end lugs 148a of the antifriction-type pulley 98a. Springs 218 of suitable stiffness surround the adjustment screws 152a and are interposed between the crossbar 212 and bracket 214, so that on tightening the screws 152a the springs 218 will be loaded and their force will urge the pulley 98a into tensioning the steel belt 94a. With this arrangement, the tensioning of the steel belt 94a will respond in micrometer-like fashion to the adjustment of the screws 152a, thereby not only facilitating the task of accurately adjusting these screws for a desired tension in the steel belt and for non-creep of the latter on either of its pulleys, but also more securely and lastingly holding the steel belt under a given tension. Furthermore, if perchance a foreign particle should find its way into the cylinder unit 138a and get between the pulley 98a and steel belt 94a, the springs 218 will yield sufficiently to permit the passage of the particle from the pulley and belt without interfering with their performance or damage to either.

Reference is now had to Fig. 13 which shows an alternative and mostly preferred mode of adjusting the tension of the steel belt 94a without incurring any lateral creep of the same on its pulleys on operation of the apparatus. Thus, either one or both of the pulleys, presently at least the pulley 98a shown, is provided with a substantially central peripheral groove 230 which may be viewed through a relatively large sight hole 232 in the end member 134a of the cylinder 138a to observe the alignment of successive holes 202a in the belt 94a with the pulley groove 230 during a longitudinal trial feed of the primary table. If the preceding adjustment of the set screws of the pulley 98a, for a desired tension of the steel belt 98a was non-uniform, progressive holes 202a in the steel belt will be observed to creep out of alignment with the peripheral pulley groove 230, indicating correction of the adjustment of the set screws of the pulley 98a until progressive holes 202a in the steel belt remain in alignment with the pulley groove 230 as observed through the sight hole 232. The sight hole 232 in the end member 134a of the cylinder 138a is normally closed by a removable plug 234.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said pulleys are antifriction bearings having inner and outer races and opposite end lugs on the inner races projecting beyond the outer races, and each of said bearings is held to its respective member by adjustable set screws connecting the latter with the end lugs, respectively, on the inner race of said bearing to hold said steel belt under predetermined tension.

2. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said belt has narrow mark means longitudinally thereof, each of said pulleys has a shaft and is held to its respective member by two set screws which are spaced axially of said pulley and connect said member with said shaft to hold said steel belt under predetermined tension, and said cylinder has a sight hole in line with said mark means to aid in achieving even adjustment of either pulley by its respective set screws.

3. In apparatus of the character described, the combination with a support, and two tables thereon independently movable in parallel paths, respectively, of a device operative on movement of one table in either direction in its path for moving the other table in its path an equal amount but in a direction opposite to that of said one table, said device comprising laterally spaced rods extending parallel to said paths and being carried by said tables, respectively, two mounting members slidable on said rods, a spacer sleeve surrounding said rods and interposed between said members to form with the latter a cylinder, rotary pulleys carried by said members inside said cylinder, a taut steel belt drivingly connecting said pulleys and having between the latter operating runs parallel to and adjacent the rods, respectively, within said cylinder, the latter being secured to said support against longitudinal movement relative thereto, and elements carried by said rods, respectively, within said cylinder to which the adjacent belt runs are secured so as to move with said rods on movement of said one table, said belt has longitudinally aligned and relatively small holes of identical diameters, said pulleys are antifriction bearings having inner and outer races of which the outer race of at least one bearing has a substantially central peripheral groove of a width substantially equal to the diameters of said holes, each of said bearings is with its inner race held to its respective member by two adjustable set screws spaced axially of said bearing to hold Signed and sealed this 9th day of May 1961.

[SEAL]
Attest:
ERNEST W. SWIDER,
*Attesting Officer.*

DAVID L. LADD,
*Commissioner of Patents.*